April 17, 1945. A. LENTZ 2,373,694
DRIVER'S SEAT ESPECIALLY FOR TRACTORS AND AGRICULTURAL MACHINES
Filed Feb. 8, 1941 2 Sheets-Sheet 1
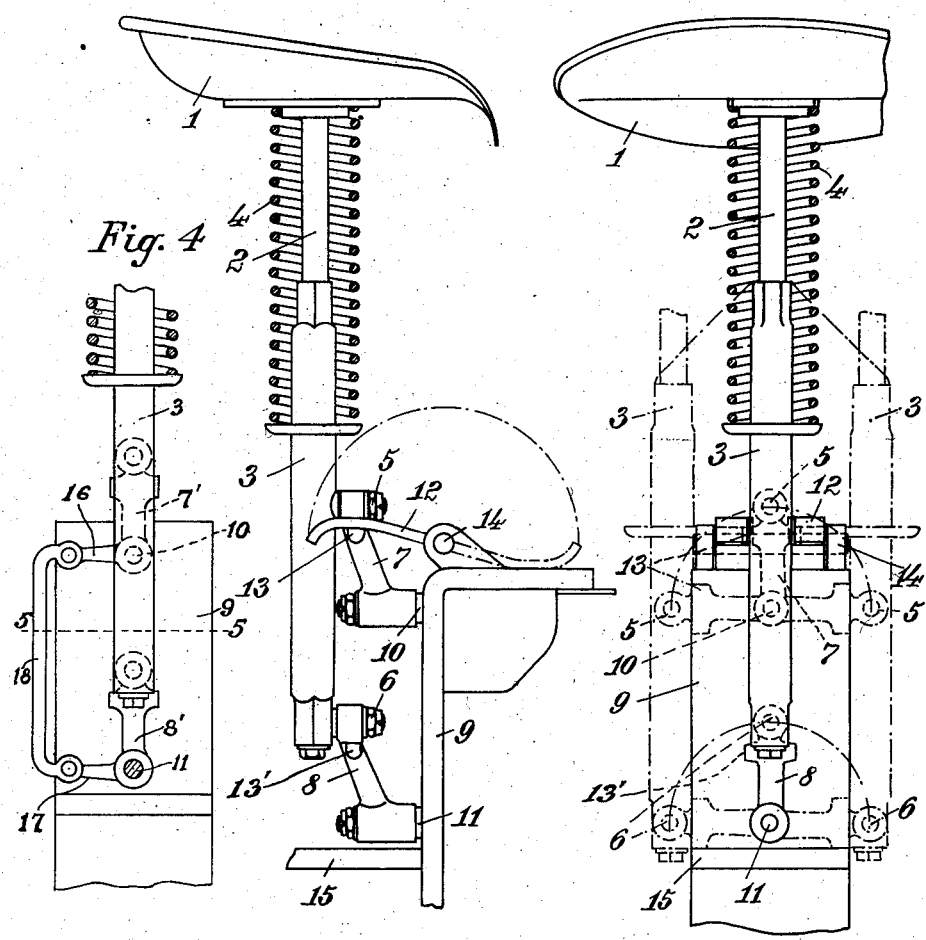
Inventor
ANTON LENTZ
By
Karl A. Mayr
Attorney April 17, 1945.   A. LENTZ   2,373,694
DRIVER'S SEAT ESPECIALLY FOR TRACTORS AND AGRICULTURAL MACHINES
Filed Feb. 8, 1941   2 Sheets-Sheet 2

Inventor
ANTON LENTZ

By

Karl A. Mayr
Attorney

Patented Apr. 17, 1945

2,373,694

UNITED STATES PATENT OFFICE 2,373,694

DRIVER'S SEAT, ESPECIALLY FOR TRACTORS AND AGRICULTURAL MACHINES

Anton Lentz, Heidelberg, Germany; vested in the Alien Property Custodian

Application February 8, 1941, Serial No. 378,045
In Germany February 12, 1940

3 Claims. (Cl. 155—51)

This invention relates to a driver's seat, especially for a tractor or the like. The object of the invention is to arrange the seat on the vehicle so that it is possible to displace it laterally. If a tractor is used for cultivating fields, that is for drilling and such work, when it is necessary to keep the tractor in the rows to be worked, the driver must observe the course of the front wheels. As the driver's seat is usually fixed on the tractor, it is difficult for him to observe, from the seat the course of the wheels on both sides. According to the invention, the seat is arranged on the tractor so that it can be shifted laterally and secured in different positions. Thus the position of the seat can be selected as required, on the left or right side, or in the middle, so that the driver during the travel of the tractor in the rows can easily observe the course of both front wheels, and can guide the tractor correctly in the rows. The seat is connected with the vehicle by means of links on pivots on the longitudinal axis of the vehicle so that it can be oscillated from side to side of the vehicle. This arrangement is designed so that the pivots for supporting the links are located one above the other. By thus mounting the seat, it can be oscillated from side to side, the links moving through an arc of 180°. In the middle position, the seat is secured by a latch hinged on the tractor, and in its extreme lateral positions, the seat is supported by an abutment limiting the swinging of the links. In order to maintain the links in relative parallel position, they may be constructed as bell-cranks, and one arm of each lever pivotally connected by a link, their other arms being connected by a post supporting the seat. In this way, the links are caused to oscillate together, preventing any possibility of the links moving from the middle position in opposite directions, and thus maintaining the seat-supporting post constantly vertical.

In the drawings:

Fig. 1 is a side elevation of the device.

Fig. 2 is a rear elevation.

Fig. 4 is a view similar to Fig. 3, the seat being in the middle position.

Fig. 5 is a horizontal section on the line 5—5 of Fig. 4.

Figure 6:
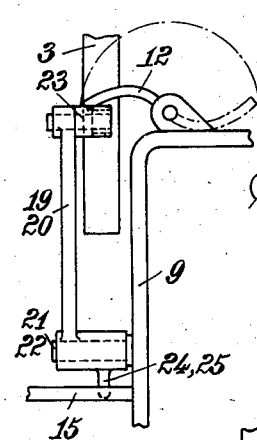
Fig. 6 is a side elevation of another form of the device.

The seat 1 is mounted on the upper end of a rod 2 suitably supported on the post 3 by a spring 4. On the post 3 are vertically aligned pintles 5 and 6 on which are pivotally mounted the links 7 and 8, respectively, pivotally connected with the tractor 9 by vertically aligned pintles 10 and 11 which are disposed one below the other on the longitudinal axis of the tractor 9. A forked latch 12 is pivoted on the tractor 9, and when in the position shown in solid lines in Fig. 1, its arms bear against the stops 13 on the upper link 7. It is obvious that, when the latch 12 is swung on its pintle 14 to the position shown in broken lines in Fig. 1, the link 7 is not restrained and can be swung either to the right or to the left, as shown in broken lines in Fig. 2, until the stops 13' on the lower link 8 bear against the abutment 15 mounted on the tractor 9, and the seat is secured in its extreme position, to the right or to the left.

Figure 3:
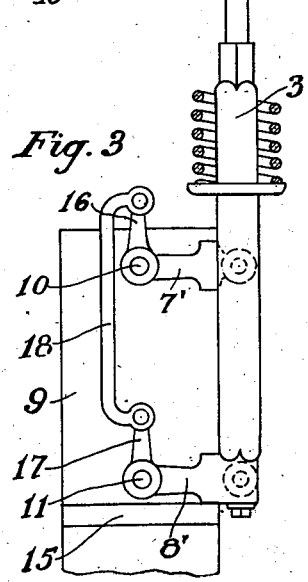
Fig. 3 is a rear elevation of a modified form of the device, the seat being moved to the right.

In the modified form of the device, illustrated in Figs. 3, 4 and 5, the links 7' and 8' are in the form of bell-cranks having the arms 16 and 17 respectively, pivotally connected by the link 18. It is obvious from Figs. 3 and 4, that the link 18 maintains the desired relation of the links 7' and 8', so that the post 3 is constantly vertical.

Figure 7:
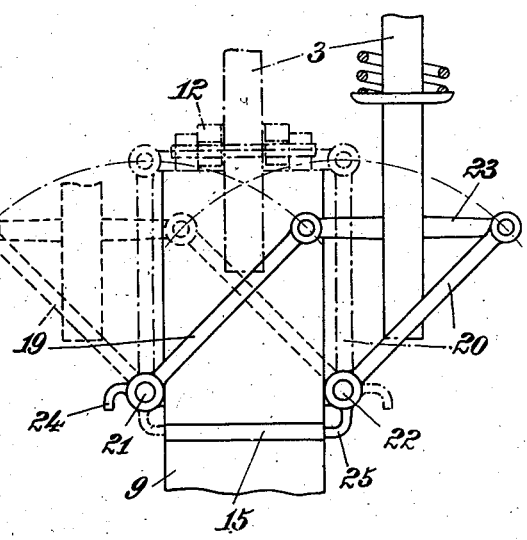
Fig. 7 is a rear elevation of the form shown in Fig. 6.

In the modified form of the device illustrated in Figs. 6 and 7, the links 19 and 20 are pivotally mounted on the pintles 21 and 22 on the tractor 9, respectively. The free ends of the links 19 and 20 are pivotally connected by a link 23 on which the seat-supporting post 3 is fixed, approximately at the middle of the link 23. In the middle position of the seat-supporting post 3, the links 19 and 20 are vertically disposed, and the post 3 is secured in that position by the latch 12. To secure the seat in its extreme positions to the right or to the left, the links 19 and 20 are provided with the arcuate stops 24 and 25, respectively which bear against the ends of the abutment 15 on the tractor 9, when the links 19 and 20 are oscillated to move the seat to the extreme positions.

I claim:

1. An adjustable support mechanism for the driver's seat of a tractor or the like, comprising in combination a seat-supporting post having two vertically aligned pintles, two vertically aligned pintles fixed on the tractor and disposed on the longitudinal axis thereof, a pair of links, each of which has one end pivotally mounted on one of the pintles on the post, and its other end pivotally mounted on one of the pintles on the tractor, an abutment fixed on the tractor limiting the travel of one of the said links about its pintle on the tractor, and latch means adjustably mounted on the tractor for releasably holding said post at a point intermediate the limits of travel of said limited link.

2. An adjustable support mechanism for the driver's seat of a tractor or the like, comprising in combination two lever members, each pivotally connected with said tractor, and swingable in an arcuate path transverse to the longitudinal axis of the tractor; a connecting means pivotally connected to and interconnecting the swinging ends of said lever members and comprising a rod-like seat supporting means, each lever member having two arms disposed at an angle with respect to, and rigidly connected with one another, the free end of one arm of each member being swingably connected with said connecting means, and a link member movably connected to and interconnecting the free ends of the other arms of said members.

3. An adjustable support mechanism for the driver's seat of a tractor or the like, comprising in combination two lever members, each pivotally connected with said tractor, and swingable in an arcuate path transverse to the longitudinal axis of the tractor, a connecting means pivotally connected to and interconnecting the swinging ends of said lever members and comprising a rod-like seat supporting means, each lever member having two arms disposed at an angle with respect to one another, the free end of one arm of each member being swingably connected with said connecting means, and a link member movably connected to and interconnecting the free ends of the other arms of said members, said lever members swinging about pintles disposed one below the other and having axes of rotation substantially parallel to the longitudinal axis of the tractor.

ANTON LENTZ.